Patented Sept. 2, 1941

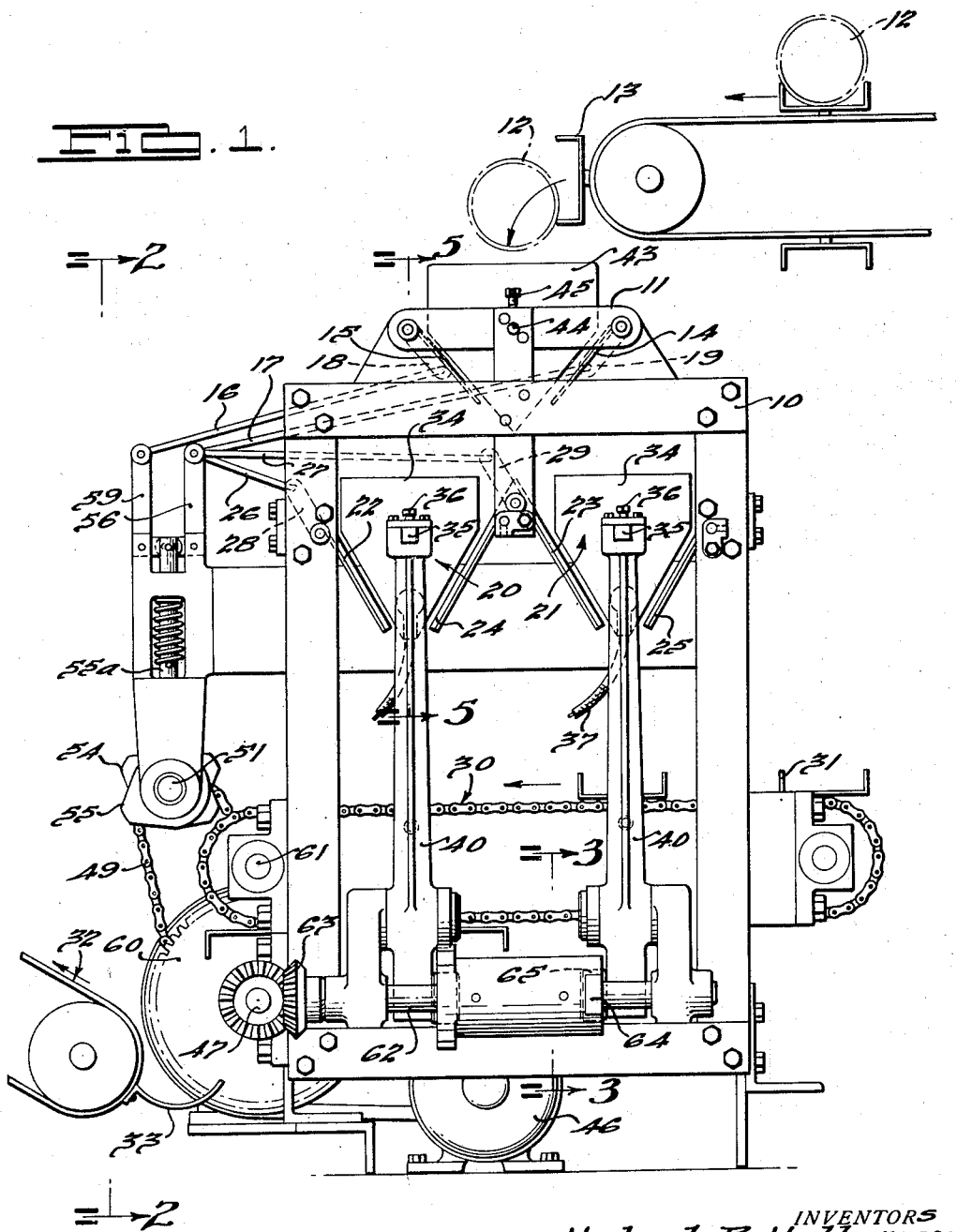

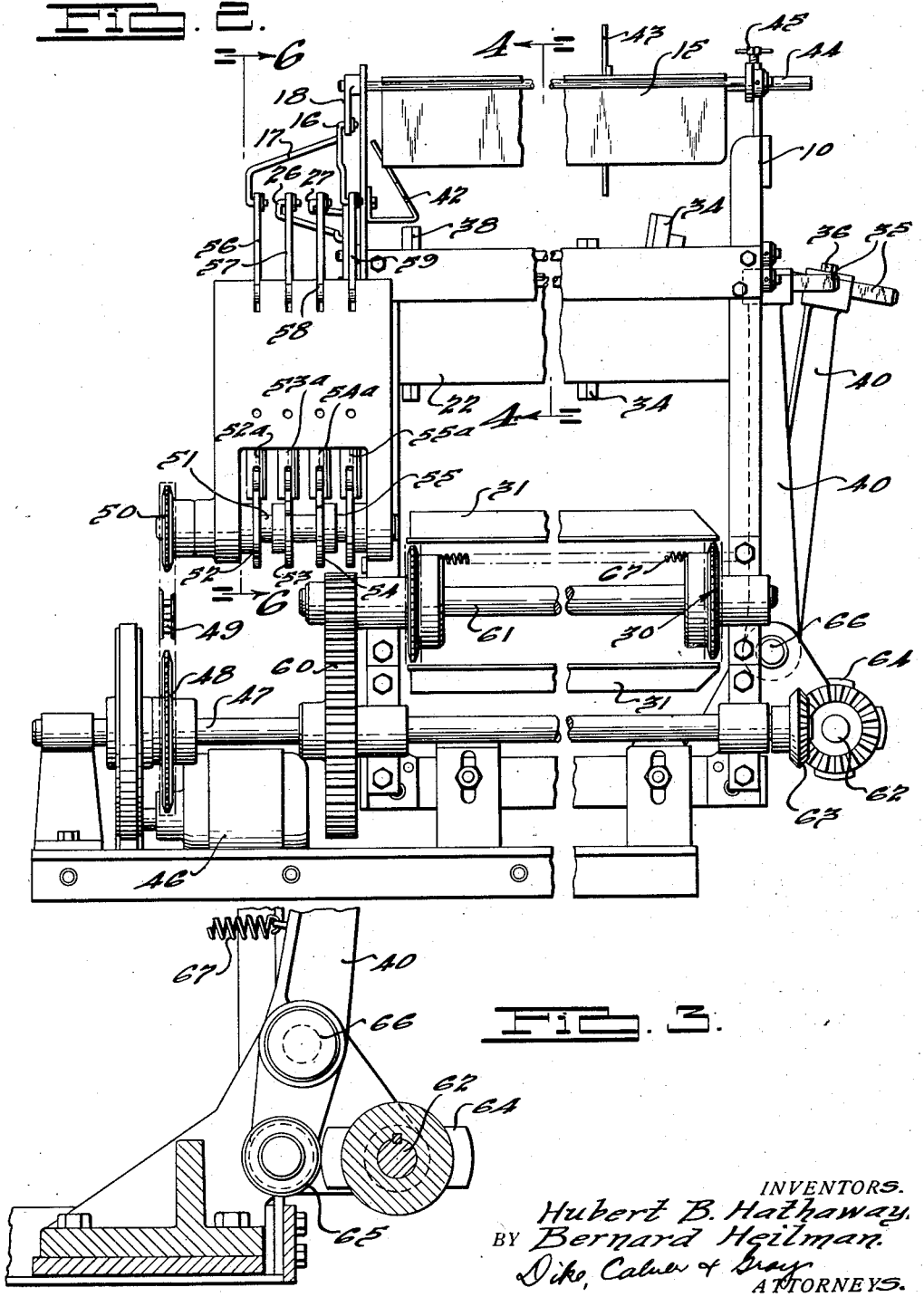

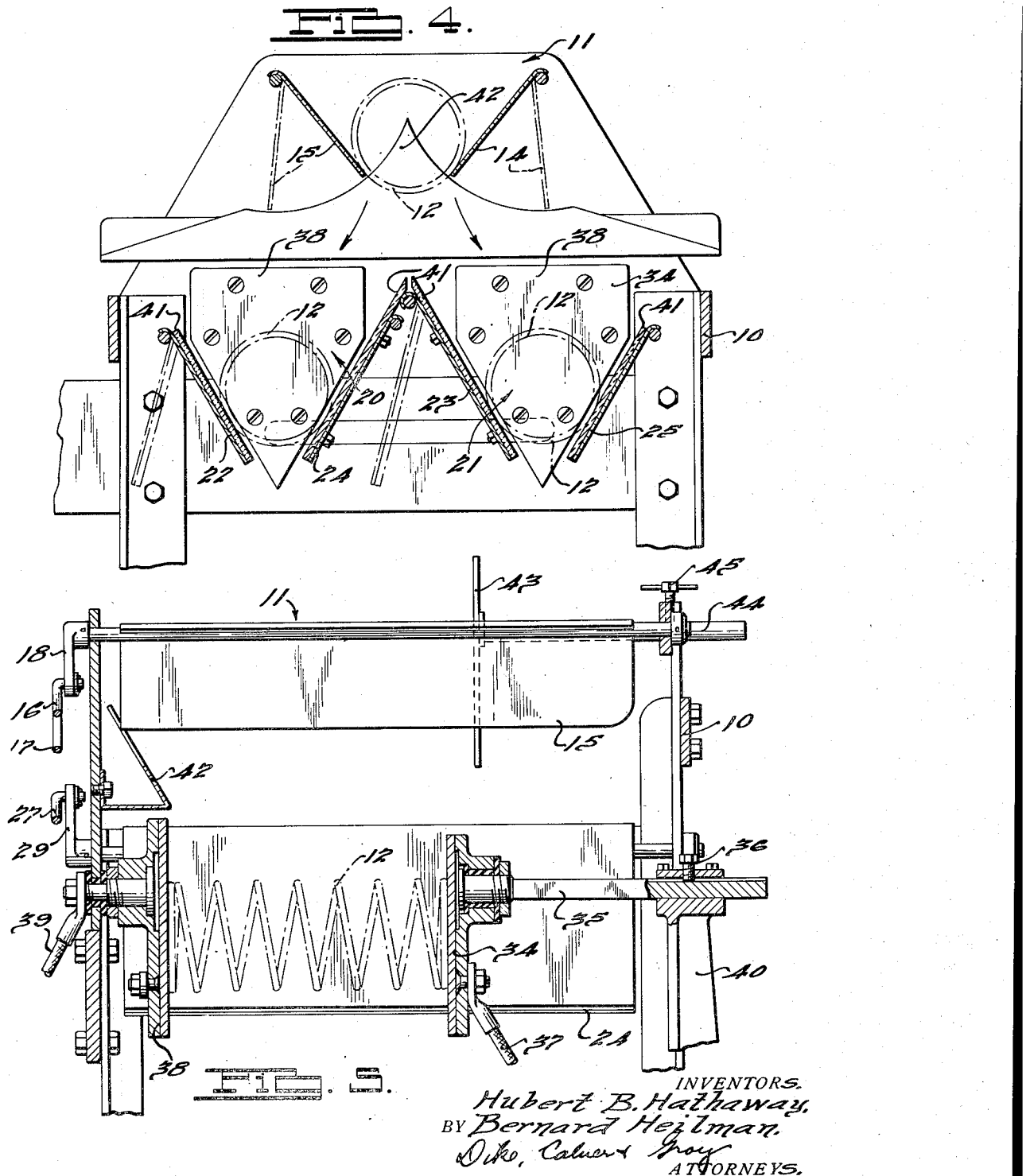

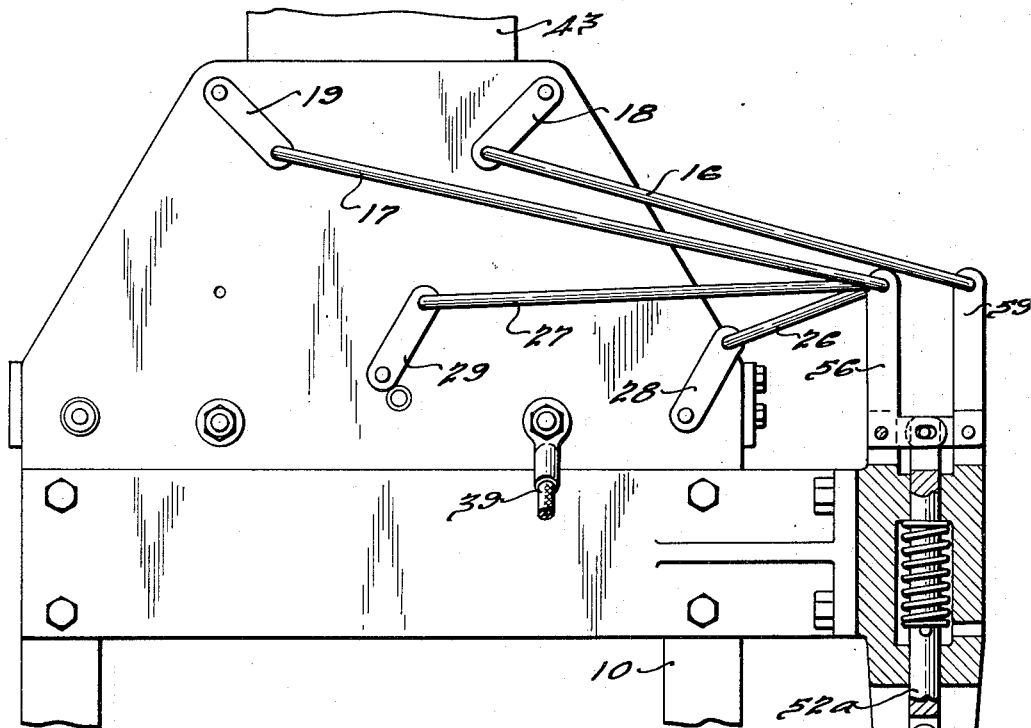
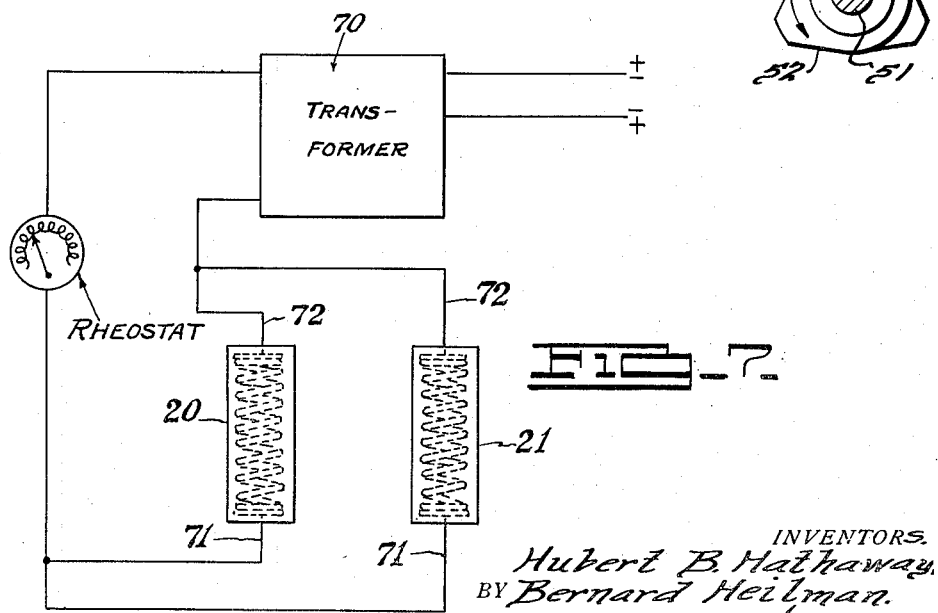

2,254,525

UNITED STATES PATENT OFFICE

2,254,525

MACHINE FOR MANUFACTURING COIL SPRINGS

Hubert B. Hathaway, Windsor, Ontario, Canada, and Bernard Heilman, Detroit, Mich., assignors to L. A. Young Spring & Wire Corporation, Detroit, Mich., a corporation of Michigan Application September 18, 1939, Serial No. 295,352

10 Claims. (Cl. 219—11)

The present invention relates to a machine used in the manufacture of coil springs and particularly to a machine adapted for the heat treating of individual coil springs for the purpose of effecting a controlled heating thereof to normalize, anneal or temper the metal in each individual spring.

Prior to the present invention it was customary to provide heat treatment of spring members, particularly coil springs when formed from so-called steel spring wire stock. The purpose of heat treating such springs is to normalize the strains in the wire and anneal or temper the metal thereof, so that the final spring has the desired and predetermined strength and resiliency characteristics.

While the terms "tempered," "annealing" and "normalizing" are used somewhat loosely in this art, the terms as used herein are intended to designate any heat treating operation which has for its purpose or effect the elimination of stresses and strains in the wire due to the spring-forming operation and the heat treatment of the wire in the spring to give to the spring the desired strength and resiliency.

Prior to the present invention it was the common practice in plants where coil springs were manufactured to subject the formed springs to a heat-treating operation by placing the springs in a heat-treating oven where they were subjected to the desired temperature for the desired length of time. Due to the variation in the sizes of the springs and due also to the placement of the springs in baskets or on racks when passing through such ovens, it was found that it was very difficult to control the heat treatment in such a way as to insure uniform treatment of each spring in the oven. In addition, the problem of handling the springs after the heat treatment was greatly complicated due to the fact that the heat treatment caused the springs to move in the direction of the coiling which resulted in the various springs becoming entangled with each other, requiring a large amount of nonproductive time to be consumed in sorting and separating the springs at the conclusion of the heat-treating operation. In addition, such ovens required the treating of a large number of springs at each operation. Consequently, it was difficult to control or to vary the heat treatment so as to assure uniform treatment of each individual spring. The springs after heat treatment had not taken their initial set and thus could not be said to possess a fixed finished dimension. The property of such springs to take an initial set after coiling is well known to those skilled in the art and some attempts have been made to subject the heat-treated springs to compression forces by a series of operations which had for their purpose the "setting" of the springs. Such operations in addition to requiring separate handling of the springs were not readily controllable and produced springs having uncontrolled variations of properties and sizes within desired limits and costs.

It is a principal object of the present invention to provide a novel machine for the heat treatment of coil springs wherein each spring is subjected to a separate and individual heat treatment for the purpose of normalizing, annealing or tempering the metal in the spring.

A further object of the invention is to provide a machine for the heat treatment of coil springs which is adapted to subject each spring to separate heat treatment under controlled conditions to impart substantial uniformity of size, strength and resiliency to the springs by economical and commercial manufacturing operations and in which each spring is caused to take its initial set during the heat-treating operation.

Another object of the invention is to provide an automatic machine for the individual heat treatment of coil springs and in which provision is made for distributing the untreated coil springs individually to separate heat-treating chambers and wherein the heat treatment of each spring is automatically timed and controlled.

It is a further object of the invention to provide an automatic machine for the individual heat treatment of coil springs and in which provision is made for the separate heating of each spring as a resistance unit in a closed electrical circuit carrying a controlled flow of electric current.

A still further object of the invention is to provide an automatic machine for the individual heat treatment of coil springs and in which provision is made for heating each spring as the resistance element in a closed electric circuit while partially compressed and thereby causing the spring to take its initial set during the heat-treating operation.

Other objects and advantages of this invention will appear in the following description and appended claims, reference being had to the accompanying drawings forming a part of this specification, wherein like reference characters designate corresponding parts in the several views.

The present application is related to the Hathaway application Serial No. 294,238 and covers a machine particularly adapted to utilize the method therein disclosed and claimed.

In the drawings:

Fig. 1 is a front elevation of a machine embodying the present invention;

Fig. 2 is a fragmentary side elevation taken substantially from the line 2—2 of Fig. 1 in the direction of the arrows;

Fig. 3 is a fragmentary section taken substantially on the line 3—3 of Fig. 1 in the direction of the arrows;

Fig. 4 is a section taken substantially on the line 4—4 of Fig. 2 in the direction of the arrows;

Fig. 5 is a section taken substantially on the line 5—5 of Fig. 1 in the direction of the arrows;

Fig. 6 is an elevation, partially in section, taken substantially on the line 6—6 of Fig. 2 in the direction of the arrows; and Fig. 7 is a diagrammatic view of one electrical wiring circuit which may be utilized in connection with the present invention and shows a current regulating means.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings and particularly to Figs. 1 and 2, a machine embodying the present invention preferably comprises a frame 10 to which is affixed a distributing hopper 11 which is adapted to receive the coil springs 12 which are to be treated. The coil springs 12 are delivered to the hopper 11 by a conveyor 13 which preferably receives the springs either directly from a spring-winding machine or from a storage pin (not shown).

As shown in greater detail in Fig. 4, the distributing hopper 11 is an open substantially V-shaped chamber having a swinging side 14 and a swinging side 15, each of which is adapted to be moved separately relative to the other. A rod 16 is connected with an arm 18 and when moved causes the side 15 to be swung. A rod 17 is connected with an arm 19 which is adapted to impart a swinging movement to the side 14 of the hopper 11. It will be seen that by swinging either of the side portions 14 and 15 of the hopper 11, the springs 12 therein are dropped downwardly to the heat-treating chamber 20 or 21, each of which is an open substantially V-shaped chamber. The chamber 20 has a movable side member 22 and an inclined fixed wall 24. The chamber 21 has a movable side 23 and an inclined fixed wall 25. The fixed walls 24 and 25 are arranged in such a manner as to be substantially in alignment with whichever of the sides 14 and 15 of the hopper is not moved during a spring-discharging operation and in this way act as guides for the springs to be treated so as to cause the springs to occupy the desired position in the heat-treating chambers. It is understood that the walls 24 and 25 may also be made movable if desired.

The movable sides 22 and 23 are operatively connected with rods 26 and 27 which are connected through arms 28 and 29 so that upon actuation of the rods 26 and 27, the movable sides 22 and 23 are moved so as to discharge a spring normally held in the heat-treating chambers when the sides are swung to the closed position as shown in Fig. 1. In a preferred embodiment of the invention we have found that the movable sides 22 and 23 when left in a partially unclosed position during the heat-treating operation, may thereafter be closed and in closing be made to exert a side thrust on the spring in said chamber and so dislodge the spring therefrom and free its ends from any possible adherence to the electrodes prior to opening said sides 22 and 23.

Directly beneath the discharge portions of the heat-treating chambers 20 and 21 is a power-driven conveyor 30 which is synchronously driven and which is provided with a plurality of individual spring-receiving pockets 31 which are aligned to receive springs when discharged from the chambers 20 and 21. The power-driven conveyor 30 is adapted to carry the springs from the point of their discharge from the heat-treating chambers 20 and 21 to a power-driven conveyor 32 having a plurality of separate spring-carrying pockets 33 which carry the springs to other conveyors or to other places in the factory as may be desired.

The springs 12 are subjected to heat treatment while in the chambers 20 and 21 by being heated by the flow of electric current through the closed circuit in which the springs are a resistance unit. The electric current is supplied to each chamber through an electrical circuit which is normally closed when the springs are placed in the chambers and are partially compressed and ready for the heat treatment. The electric circuit in each chamber is shown in Fig. 5 and is the same for each of the heat-treating chambers employed in the machine. The electric circuit consists essentially of a movable and adjustable electrode 34 which is carried by a swinging arm 40. The electrode 34 is held on an adjustable rod 35 which is normally locked in a predetermined adjusted position by the set screw 36. This permits adjustment of the machine in order to adapt it for use with springs of different lengths and also to control the amount of compression to which each spring is subjected during the heat treatment thereof.

An electric cable 37 connects each movable electrode 34 (Fig. 5) with a source of electric current, in a preferred instance a transformer 70 (Fig. 7). At the opposite end of each of the heat-treating chambers is provided a stationary electrode 38 which is electrically connected with a suitable source of electrical energy, which also may be the transformer 70, by an electrical conductor cable 39. In order to prevent short circuiting of the electric current through the chambers 20 and 21, the sides 22 and 23 and the walls 24 and 25 are each electrically insulated by a layer of a suitable electrical insulating material, such for example as a sheet of moulded material possessing the desired dielectric properties.

In Fig. 7 there is illustrated one wiring circuit which may be used in connection with the present invention. As there shown, the transformer 70 is connected with a suitable source of electric energy and is connected to the cable 37 (Fig. 5) leading to each movable electrode 34 by means of a suitable lead or leads indicated at 71—71. Also the cable 39 (Fig. 5) leading to each stationary electrode 38 is connected to the transformer 70 by suitable leads shown at 72—72. A rheostat or other circuit regulating means is inserted in the circuit in a manner suitable to permit regulation or control of the amount of electric current which is transferred from the transformer to each set of electrodes 34—38 in each of the heating chambers 20 and 21. One operable location of this rheostat is shown at Fig. 7 although any suitable location thereof may be utilized, as may any wiring circuit adapted to permit a controlled or desired amount of electric current to pass through each set of electrodes 34—38 when these electrodes are connected by a spring for heat treating through electrical resistance, in the manner more fully explained hereinafter.

Referring to Fig. 5 it will be seen that the hopper 11 is provided with a fixed inclined baffle member 42 which is adapted to direct the ends of the springs 12 coming in contact therewith downwardly toward the heating chambers, and is also provided with an adjustable end plate 43 which is carried by a rod 44 which may be adjustably locked in a plurality of positions by the adjustable set screw 45. This permits adjustment of the distributing hopper 11 so as to adjust the machine to accommodate various lengths of springs to be treated therein.

The machine here disclosed as a preferred embodiment of the invention is provided with a single distributing hopper 11 and two heat-treating chambers 20 and 21. It is to be understood, however, that various arrangements of the hopper and heat-treating chambers may be provided within the scope of the present invention. As herein disclosed, the machine is designed to operate so that as the springs 12 are fed into the hopper 11, they are alternately discharged from the hopper 11 to the heat-treating chambers 20 and 21 and the heat-treating chambers 20 and 21 are alternately actuated to connect the springs therein to the electrical circuit, thereby closing the circuit and effecting a heating of the springs in one chamber at a time. It is to be understood that such an arrangement is merely a preferred arrangement of the machine embodying the present invention, as the machine may be adjusted in such a manner that the springs may be simultaneously connected and heated in both chambers at the same time.

It is to be understood, therefore, that the machine as herein disclosed is of the synchronous type which is adapted to perform a predetermined cycle of synchronized operations, as will hereinafter be more fully described.

The driving and synchronizing mechanism of the machine consists of a driving motor 46 (Figs. 1 and 2) connected by suitable gearing to drive the drive shaft 47 at a predetermined speed. The drive shaft 47 drives a cam shaft 51 through sprockets 48 and 50 and a drive chain 49 and causes the cam shaft 51 to move at a predetermined speed relative thereto. The cam shaft 51 is provided with actuating cams 52, 53, 54 and 55 which are adapted to move the respective cam followers 52a, 53a, 54a and 55a and to actuate the pivoted bell crank members 56, 57, 58 and 59, each of which is provided with an arm for connection, respectively, with the rods 17, 26, 27 and 16.

In the embodiment of the invention here shown the member 56 is connected with the rod 17, the member 57 is connected with the rod 26, the member 58 is connected with the rod 27 and the member 59 is connected with the rod 16, the rods being in turn connected with the arms 18, 19, 28 and 29 as previously disclosed, for the purpose of causing swinging movement of the connected swinging walls either of the distributing hopper 11 or of the heat-treating chambers 20 and 21.

The cams 52, 53, 54 and 55 are so arranged that upon each revolution of the shaft 51, each of the sides 14 and 15 of the distributing hopper 11 is separately moved to discharge springs 12 alternately to the heat-treating chambers 20 and 21, so that the movable sides 22 and 23 of the chambers are opened and closed during each revolution of the shaft 51 so as to discharge a treated spring from the heat-treating chambers and to close the chambers to be ready to receive the next succeeding spring from the distributing hopper 11. During this operation the conveyor 30 is moved in synchronism with the opening of the chambers 20 and 21 to receive the springs discharged from such chambers. The conveyor 30 is driven by the shaft 47 through gears 60 which are operatively connected with the driving shaft 61 of the conveyor. During the operation of the machine the movable arms 40 carrying the movable electrodes 34 are synchronously driven by the cam shaft 62 which is connected by the bevel gears 63 with the drive shaft 47. The shaft 62 (Fig. 3) is provided with cams 64 which contact the roller cam followers 65 carried by the lower end of each of the arms 40. This causes the arms 40 to pivot about the pivot point 66 and against the tension of the springs 67.

As shown in Fig. 2, the cams 64 are provided for each arm 40 and it is to be understood that while two arms only are here used, any desired number of such arms may be used so as to permit the use of any desired number of heat-treating chambers in the machine embodying the present invention, there being one arm 40 used for the movement of the movable electrode into each of the heat-treating chambers.

The operation of the machine previously described is as follows:

The untreated springs 12 are delivered from a spring-forming machine or a supply of preformed untreated springs (not shown) and are carried by the conveyor 13 where they are discharged into the open top of the distributing hopper 11. If desired, the hopper 11 may be arranged adjacent a spring-forming machine in such a manner that the coiled springs are dropped from the coiling machine directly into the open top of the hopper 11. The sides 14 and 15 of the distributing hopper 11 are actuated so as to discharge the spring therefrom and to deliver the spring to either the heat-treating chamber 20 or the heat-treating chamber 21, as desired. During this operation the ends of the spring 12 contact the fixed inclined baffle member 42 and the adjustable end plate 43 and are guided into position thereby. The end plate 43 is pre-adjusted with relation to the baffle 42 so that the untreated spring 12 will drop freely between the end plate 43 and the baffle 42 and thereafter be released upon movement of the side 14 or 15 so as to permit the springs to drop into the heat-treating chamber 20 or 21. The selection of the particular chamber into which the spring 12 is dropped is the function of the synchronized timing mechanisms previously described and by means of which the sides 14 and 15 are swung alternately to effect the alternate feeding of the springs 12 to the heat-treating chambers 20 and 21.

As the spring 12 in its substantially uncompressed condition is dropped into the chamber 20 or 21, the arm 40 is moved inwardly by the action of the cam 64 and the cam roller follower 66, and the movable electrode 34 carried by said arm 40 is thereby brought into contact with an adjacent end of the untreated spring 12, after which the continued movement of the arm 40 causes the spring 12 to make a firm substantially non-arcing contact between the electrodes 34 and 38 while the spring 12 is in a partially compressed condition. The extent to which the spring is compressed is determined by the amount of compression required to secure a positive non-arcing contact with the electrodes and to cause the springs to assume an initial set by the time the heating operation is completed. When this condition is established, the electrical circuit in the heat-treating chamber is closed and the spring 12 becomes a resistance element in the circuit and is heated by the flow of electric current through the circuit. The intensity of the current is regulated by the adjustment of the transformer 70 (Fig. 7) or by any other suitable means. The time of heating the spring is regulated by the timing of the machine for when the arm 40 is moved outwardly from the heat-treating chamber 20 or 21, it carries with it the electrode 34 and as soon as contact between the electrode 34 and the end of the spring 12 is broken, the whole circuit is open and there is no further heating of the spring 12. The adjustment of the machine is such that when the circuit is broken, the movable side 22 or 23 is moved by the cam action previously described, and the hot spring is discharged on to the conveyor 30 and delivered to the conveyor 32.

After the spring is heated to the desired extent and for the desired length of time and the movable electrode 34 is moved, the spring is allowed to assume an uncompressed form. After being compressed and heated it will be found that a spring such as that previously described will have taken its initial set. Accordingly such springs when assembled in a completed article such as an automobile seat cushion will have at all times a definite and predetermined length which will not vary due to the springs taking an "initial set" after their incorporation in such an assembly.

During its travel on the conveyors 30 and 32, the spring 12 is gradually air cooled to the temperature of the surrounding atmosphere, or if desired may be cooled by a fluid-quenching bath or spray, or by a forced draft of air or by any other desired cooling means.

The machine as herein disclosed is readily adjustable for use to treat various sizes of coil springs and has been operated successfully in the heat treatment of various sizes of coil springs using 110 to 220 volts of alternating current at frequencies of 60 or more cycles, which was passed through a dry transformer wherein it was reduced to approximately 6 to 40 volts. The springs treated were produced from steel spring wire having a carbon content ranging from .40% to .85% and ranging in size from 18 to 8 gauge (Washburn & Moen). A preferred type of such wire is that which is known commercially as "Premier" wire and which has a carbon content of approximately .50% to .70%. Such springs were suitably heat treated by heating to temperatures of approximately 450° to 525° F. in approximately one second for each spring. The springs after winding but prior to heat treatment had untreated sizes prior to taking their initial set within the range of approximately 4 to 16 inches in length and they were compressed during the heat-treating operation to sizes ranging between approximately 3½ to 15 inches. After the heat treatment and the release of the compression forces, the treated springs were found to have taken their initial set and returned to finished lengths within the range of approximately 3¾ to 15¾ inches. In other words, each spring after heat treatment had taken an initial set which reduced its pre-treated length by approximately ¼ of an inch. According to all prior processes known to us, it is a characteristic of the heat-treated springs not to take an initial set after the completion of the heat-treating operation, unless specially treated by a separate operation. Such springs required relatively expensive treatment or processing after the heat-treating operation in order to cause the springs to take an initial set.

It is to be understood that various changes may be made in the design and operation of a machine embodying the present invention, such for example as changes in the design and number of distributing hoppers 11 and the heat-treating chambers 20 and 21, as well as in the adjustments which determine the speed, cycle and timing of the synchronized operations of the machine.

When compared to springs treated by conventional heat-treating processes, it was found that the springs treated by the machine herein disclosed were properly tempered and were found to be more resistant to rust and corrosion than wire springs formed of similar wire but treated according to conventional heat-treating methods. It was also found that such springs had taken their initial set and were more uniform in both strength and resiliency characteristics than springs treated by conventional operations and were superior both as to life of the spring and its lack of fatigue in use over comparable springs treated by conventional operations. The springs were also found to be but slightly magnetic and for but a short time after their discharge from the heat-treating chambers. There was no scale formation and upon photomicrographic examination of a section of the springs after the heat treatment, it was found that the wire possessed grain structure which was comparable to the grain structure of the wire prior to the coiling operation and the forming of the wire into the spring. In checking the distribution of stresses in the finished spring, it was found that such stresses are more uniformly distributed throughout the spring than is true of comparable springs when subjected to conventional types of heat-treating operations.

Since each spring is subjected to separate heat treating and is handled separately, it will be seen that there is no opportunity for the springs to become entangled and consequently that the machine eliminates the need for the consumption of a large amount of non-productive time in disentangling the springs.

We claim:

1. A machine adapted to effect the electrical heat treatment of individual coil springs and to cause said springs to assume their initial set, and including a distributing hopper adapted to receive untreated coil springs and to distribute said springs to heat-treating chambers, said hopper comprising an open top substantially V-shaped chamber having swinging sides, means for alternately swinging said side members in synchronism with the discharge of springs from the heat-treating chambers, a plurality of heat-treating chambers adjacent said hopper and adapted to receive springs from said hopper, electrodes in each of said chambers forming the terminals of an open electric circuit electrically connected with a source of electrical energy and adapted to be closed on contact of said electrodes by untreated springs, the closing of said circuit being adapted to effect heating of said springs by electrical resistance heating, control means for regulating the amount of electric current permitted to flow through said closed circuit, timing means for breaking said circuit after a predetermined heating interval, and means for discharging the treated springs from said treating chambers.

2. A machine adapted to effect the electrical heat treatment of individual coil springs and including heat-treating chambers, a distributing hopper adapted to receive untreated coil springs and to distribute said springs to said heat-treating chambers, said hopper comprising an open top substantially V-shaped chamber having swinging sides, means for alternately swinging said side members in synchronism with the discharge of springs from the heat-treating chambers, each of said heat-treating chambers being adapted to receive the springs from said hopper, a fixed electrode adjacent one end of each of said chambers and a movable electrode adjacent the opposite end of each of said chambers, said electrodes comprising the terminals of an open electric circuit connected with a source of electrical energy and adapted to be closed by contact of an untreated spring between said electrodes, said springs upon closing the circuit being heated by electrical resistance to a desired amount, control means for regulating the amount of electrical current permitted to flow through said closed circuit, timing means for breaking said circuit after a predetermined heating interval, and means for discharging the treated springs from said treating chambers.

3. A machine adapted to effect the electrical heat treatment of individual coil springs and including heat-treating chambers, a distributing hopper adapted to receive untreated coil springs and to distribute said springs to said heat-treating chambers, said hopper comprising an open top substantially V-shaped chamber having swinging sides, means for alternately swinging said side members in synchronism with the discharge of springs from the heat-treating chambers, each of said heat-treating chambers being adapted to receive the springs from said hopper, a fixed electrode adjacent one end of each of said chambers and a movable electrode adjacent the opposite end of each of said chambers, said electrodes comprising the terminals of an open electric circuit connected with a source of electrical energy and adapted to be closed by contact of an untreated spring between said electrodes, said springs upon closing the circuit being heated by electrical resistance to a desired amount, control means for regulating the amount of electrical current permitted to flow through said closed circuit, timing means for moving said movable electrode away from contact with the end of said heated spring to break said circuit after a predetermined heating interval, and means for discharging the treated springs from said treating chambers.

4. A machine for the heat treatment of individual coil springs including a distributing hopper arranged to receive untreated coil springs, a plurality of heat-treating chambers adjacent said hopper and adapted to receive springs from said hopper, each of said chambers comprising an open substantially V-shaped chamber having swinging side members adapted to be moved to open said chamber and permit the discharge of springs therefrom at the completion of the heating of said springs, means for moving said swinging sides in synchronism with the delivery of springs from said distributing hopper, electrodes in each of said chambers forming the terminals of an open electric circuit electrically connected with a source of electrical energy and adapted to be closed on contact of said electrodes by opposite ends of the untreated springs, the closing of said circuit being adapted to effect heating of said springs by electrical resistance heating, control means for regulating the amount of electric current permitted to flow through said closed circuit, timing means for breaking said circuit after a predetermined heating interval, and means for discharging the treated springs from said treating chambers.

5. A machine for the heat treatment of individual coil springs including a distributing hopper arranged to receive untreated coil springs, a plurality of stationary heat-treating chambers adjacent said hopper adapted to receive the springs from said hopper which is adapted to deliver said spring thereinto, each of said chambers comprising an open substantially V-shaped chamber having swinging side members adapted to be moved to open said chamber and permit the discharge of springs therefrom at the completion of the heating of said springs, means for moving said swinging sides in synchronism with the delivery of springs from said distributing hopper, a fixed electrode adjacent one end of each of said chambers and a movable electrode adjacent the opposite end of each of said chambers, said electrodes comprising the terminals of an open electric circuit connected with a source of electrical energy and adapted to be closed on contact of the opposite ends of an untreated spring between said electrodes, said springs upon closing the circuit being heated by electrical resistance to a desired amount, control means for regulating the amount of electrical current permitted to flow through said closed circuit, timing means for breaking said circuit after a predetermined heating interval, and means for discharging the treated springs from said treating chambers.

6. A machine for the heat treatment of individual coil springs including a distributing hopper arranged to receive untreated coil springs, a plurality of heat-treating chambers adjacent said hopper, each of which chamber is adapted to receive springs from said hopper which is adapted to deliver springs thereinto, each of said chambers comprising an open substantially V-shaped chamber having swinging side members adapted to be moved to open said chamber and permit the discharge of springs therefrom at the completion of the heating of said springs, means for moving said swinging sides in synchronism with the delivery of springs from said distributing hopper, a fixed electrode adjacent one end of each of said chambers and a movable electrode adjacent the opposite end of each of said chambers, said electrodes comprising the terminals of an open electric circuit connected with a source of electrical energy and adapted to be closed on contact of the opposite ends of an untreated spring with said electrodes, said springs upon closing the circuit being heated by electrical resistance to a desired amount, control means for regulating the amount of electrical current permitted to flow through said closed circuit, timing means for moving said movable electrode away from contact with the end of said heated spring to break said circuit after a predetermined heating interval, and means for discharging the treated springs from said treating chambers.

7. A machine adapted to effect the electrical heat treatment of individual coil springs and including a distributing hopper adapted to receive untreated coil springs and to distribute said springs to heat-treating chambers, said hopper comprising an open top substantially V-shaped chamber having swinging sides, means for alternately swinging said side members in synchronism with the discharge of springs from the heat-treating chambers, a plurality of heat-treating chambers adjacent said hopper and adapted to receive springs from said hopper, each of said chambers comprising an open substantially V-shaped chamber having swinging side members adapted to be moved to open said chamber and permit the discharge of springs therefrom at the completion of the heating of said springs, means for moving said swinging sides in synchronism with the delivery of springs from said distributing hopper, electrodes in each of said chambers forming the terminals of an open electric circuit electrically connected with a source of electrical energy and adapted to be closed on contact of said electrodes by the opposite ends of the untreated springs, the closing of said circuit being adapted to effect heating of said springs by electrical resistance heating, control means for regulating the amount of electric current permitted to flow through said closed circuit, timing means for breaking said circuit after a predetermined heating interval, and means for discharging the treated springs from said treating chambers.

8. A machine adapted to effect the electrical heat treatment of individual coil springs and including a plurality of heat-treating chambers, a distributing hopper adapted to receive untreated coil springs and to distribute said springs to the heat-treating chambers, said hopper comprising an open top substantially V-shaped chamber having swinging sides, means for alternately swinging said side members in synchronism with the discharge of springs from the heat-treating chambers, each of said heat-treating chambers being adapted to receive the springs from said hopper and each of said chambers comprising an open substantially V-shaped chamber having swinging side members adapted to be moved to open said chamber and permit the discharge of springs therefrom at the completion of the heating of said springs, means for moving said swinging sides in synchronism with the delivery of springs from said distributing hopper, a fixed electrode adjacent one end of each of said chambers and a movable electrode adjacent the opposite end of each of said chambers, said electrodes comprising the terminals of an open electric circuit connected with a source of electrical energy and adapted to be closed by contact of the opposite ends of an untreated spring therewith, said springs upon closing the circuit being heated by electrical resistance to a desired amount to effect the desired heat treatment thereof, control means for regulating the amount of electric current permitted to flow through said closed circuit, timing means for breaking said circuit after a predetermined heating interval, and means for discharging the treated springs from said treating chambers.

9. A machine adapted to effect the electrical heat treatment of individual coil springs and to cause the springs to assume their initial set, and including a receptacle for receiving untreated springs, heat treating chambers adjacent said receptacle adapted to receive springs therefrom, said receptacle having walls movable to distribute springs to said chambers, means for so moving at least one of said walls on the discharge of a spring from one of said chambers, electrodes in each of said chambers forming the terminals of an open electric circuit electrically connected with a source of electrical energy and adapted to be closed on contact of said electrodes by untreated springs, the closing of said circuits being adapted to effect heating of said springs by electrical resistance, control means for regulating the amount of electric current permitted to flow through said closed circuit, timing means for breaking said circuit after a predetermined heating interval, and means for discharging the treated springs from said heat treating chambers.

10. A machine adapted to effect the electrical heat treatment of individual coil springs, including a receptacle for receiving untreated springs, heat treating chambers adjacent said receptacle adapted to receive springs therefrom, said receptacle being adapted to temporarily retain the springs and to distribute them to the heat treating chambers, means for operating said receptacle to so distribute a spring on the discharge of another spring from one of the chambers, a fixed electrode adjacent one end of each of said chambers and a movable electrode adjacent the opposite ends of each of said chambers, said electrodes comprising the terminals of an open electric circuit connected with a source of electric current and adapted to be closed by contact of an untreated spring between said electrodes, cam means synchronized with respect to the means for distributing the springs into and discharging them out of said chambers and adapted for moving each movable electrode to compress one of said springs, said cam being arranged to break contact after a timed interval thereby permitting the springs to cool in an uncompressed condition, and control means for regulating the amount of electrical current permitted to flow through said circuit.

HUBERT B. HATHAWAY.
BERNARD HEILMAN.

CERTIFICATE OF CORRECTION.

Patent No. 2,254,525. September 2, 1941.

HUBERT B. HATHAWAY, ET AL.

It is hereby certified that error appears in the printed specification of the above numbered patent requiring correction as follows: Page 5, second column, line 58, claim 6, for the word "chamber" read --chambers--; page 6, second column, line 59, claim 10, after "cam" insert --means--; and that the said Letters Patent should be read with this correction therein that the same may conform to the record of the case in the Patent Office.

Signed and sealed this 21st day of October, A. D. 1941.

(Seal)

Henry Van Arsdale,
Acting Commissioner of Patents.